May 10, 1927.
T. GEFFAS
1,628,360
COOKING UTENSIL
Filed Jan. 6, 1927
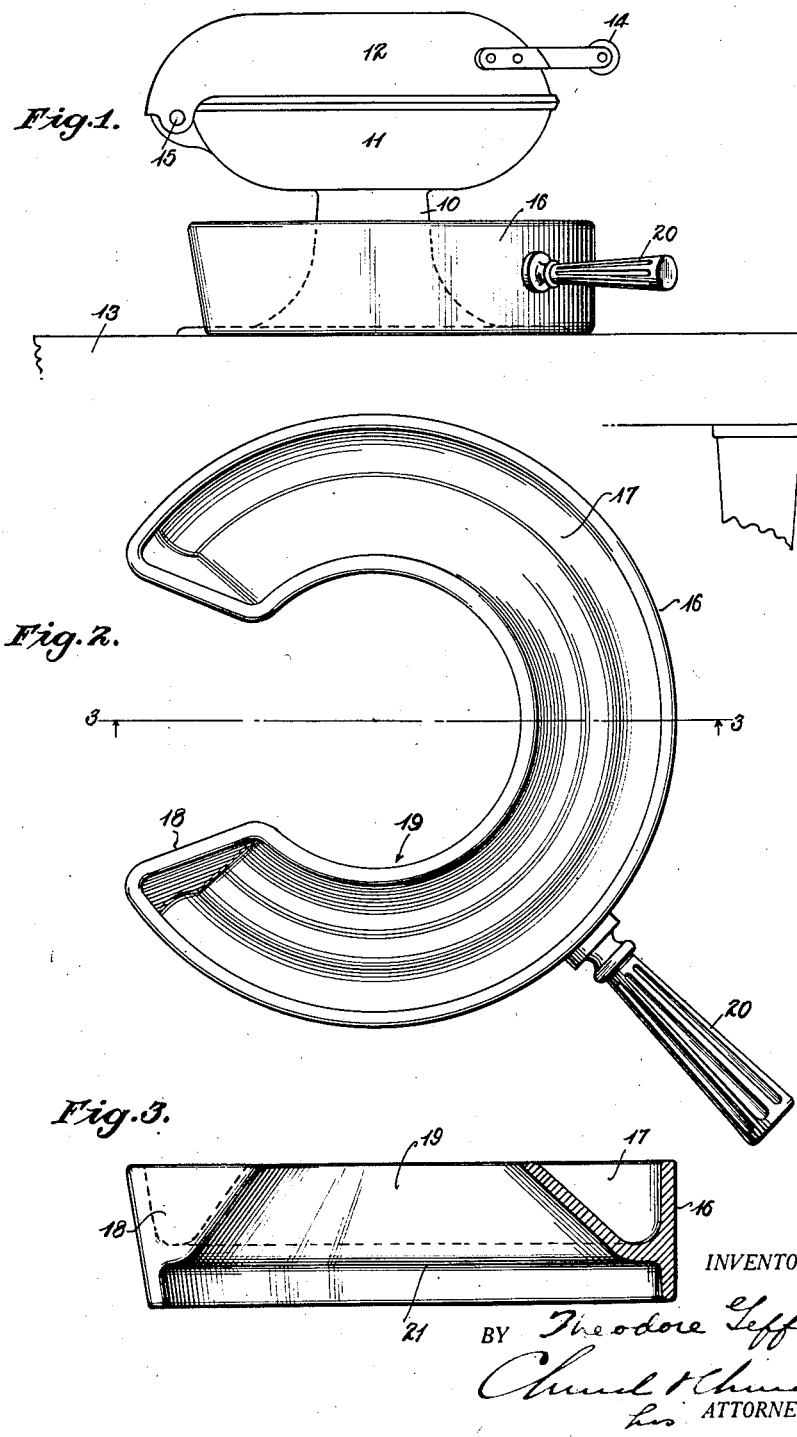
INVENTOR.
BY Theodore Geffas
ATTORNEYS Patented May 10, 1927.

1,628,360

UNITED STATES PATENT OFFICE.

THEODORE GEFFAS, OF OGDEN, UTAH.

COOKING UTENSIL.

Application filed January 6, 1927. Serial No. 159,363.

This invention relates to improvements in cooking utensils and particularly to a drip pan for cooking appliances such as waffle irons.

Primarily the objects contemplated for the present invention consist in providing a drip pan of this character which may be easily assembled around a cooking appliance such as a waffle iron; which has a recess formed therein for catching drippings from the waffle iron, said recess being so formed as to facilitate the removal of batter therefrom; and which is so formed that it may set perfectly flat against the table or other support on which the waffle iron is mounted; and, which is provided with a handle so arranged as to be located at a point to one side of the front of the waffle iron when the drip pan is positioned around or beneath the iron to receive drippings therefrom.

In the accompanying drawings,—

Figure 1 is a side elevational view of a waffle iron having the drip pan positioned to catch drippings falling therefrom;

Fig. 2 is a top plan view of the drip pan; and

Fig. 3 is a sectional view on the line 3—3 of Fig. 2.

The waffle iron consists of a pedestal portion 10 adapted to rest on a suitable support 13. At its upper end there is permanently mounted on the pedestal 10 an iron section 11 to which is hinged a second or upper iron section 12 so that the latter may be raised to open the iron for the purpose of placing batter therein. In order to facilitate use of the waffle iron the upper section 12 has a handle portion 14 and when the iron is in use it is usually placed on the support 13 in suchwise that the handle 14 is at the front or nearest the operator, the hinge connection 15 between the two sections of the iron being located at a point remote from the latter.

It is a matter of common knowledge that no one seldom places just the proper amount of batter on the iron, usually more batter than is actually necessary for a waffle being placed thereon, so that, as a consequence, a portion of the batter exudes from between the two iron sections 11 and 12 after the iron is closed down for cooking the waffle. This batter escapes before it has been heated sufficiently to cook it and it therefore escapes in a liquid state and drips onto the surface of the support 13. This results in a more or less unclean appearance and the present invention seeks to provide a drip pan for collecting such drippings so that the appearance of the iron support will always be neat and, in addition, the drippings of batter which, as has been said, are still in a liquid state will be caught and subsequently used.

The drip pan, indicated generally at 16, may be of various conformations, it only being necessary that it extend around a major portion of the waffle iron at a point beneath the periphery thereof so that the trough 17 formed in said pan will receive batter exuded from beneath the two sections of the iron. Preferably, however, said pan is of circular formation and has an opening 18 at one side thereof which merges into a central bore 19 whereby the pedestal 10 of the iron may be passed through said opening into the central bore 19 to position the pan immediately beneath the side edges of the iron sections. As very little batter escapes at the rear or hinged portion of the irons 11 and 12 the opening 18 is adapted to be located beneath the hinge members 15 when the pan is positioned around the iron, and in order to facilitate handling of the pan the handle 20 is secured to the pan at a point where it will be located to one side of the front of the waffle iron when said opening 18 is located beneath the hinge 15 of the iron sections. In this way the handle 20 does not interfere with the operator at the front of the waffle iron and as shown in Fig. 2 said handle is so located that the operator may grasp it with his left hand so that his right hand is free to be used for the purpose of removing with a spoon batter collected in the trough 17.

In this connection, attention is called to the fact that trough 17 is of peculiar cross section, one wall thereof preferably extending parallel to the axis of the central bore 19 and the other wall being inclined with respect to the first wall, whereby a spoon, of the size ordinarily used in placing batter on the iron, may be readily inserted in the trough for removing batter therefrom. Likewise, it will be noted that the trough 17 does not extend the full depth of the pan but, on the contrary, terminates at a point above the bottom edge of said pan so as to form an annular recess 21 for the reception of the extreme base portion of pedestal 10 when the pan is placed underneath the waffle iron.

By having the drip pan formed separately from the iron as distinguished from having the drippings fall in a trough-shaped flange extending around the iron itself, the present drip pan does not get hot, thereby preserving for use all batter that may exude and drip from the waffle iron. Of course, if batter exuding from the meeting edges of the section of the iron is permitted to stay on the iron it will become cooked to some extent and be useless. For this reason the drippings should be scraped from the edge of the iron immediately upon the sections being closed.

What I claim is:

1. In an article of the character described, a body portion open at one side and provided with a central bore, whereby said body may be placed around and removed from the support of a cooking appliance, there being a trough-like recess extending around said body portion into which drippings from said cooking appliance will fall.

2. In a drip pan for cooking utensils such as waffle irons, an annularly shaped body portion adapted to extend around the major portion of the perimeter of the iron, said body being open at one side to facilitate placing the pan around the base of the iron, and a trough in said body portion into which drippings from the iron may fall.

3. In a drip pan for cooking utensils such as waffle irons, an annularly shaped body portion adapted to extend around the major portion of the perimeter of the iron, said body being open at one side to facilitate placing the pan around the base of the iron, a trough in said body portion into which drippings from said iron may fall, and the base portion of said pan being recessed to accommodate the base of the waffle iron support.

4. In a drip pan for cooking appliances such as waffle irons, a body portion adapted to extend around the major portion of the perimeter of said iron, said body portion having an opening at one side merging into a central bore for the accommodation of the waffle iron support, and a trough in said body portion into which drippings from said iron may fall, one wall of said trough being disposed at an inclination to the axis of said central bore.

5. In a drip pan for cooking appliances such as waffle irons, a body portion having a trough therein adapted to extend around the major portion of the perimeter of said waffle iron, said body portion having an open side merging into a central bore for the accommodation of the support of the waffle iron, and a handle on the exterior wall of said trough, said handle and the open side of said body being so disposed relatively to each other that said handle will be positioned at the side of the waffle iron when said open side is at the rear of said iron.

THEODORE GEFFAS.